US012621788B2

(12) United States Patent
Puente Pestaña et al.

(10) Patent No.: US 12,621,788 B2
(45) Date of Patent: May 5, 2026

(54) TECHNIQUE FOR MAINTAINING A SUBSCRIPTION OF A SUBSCRIBER NF

(71) Applicant: Telefonaktiebolaget LM Ericsson (publ), Stockholm (SE)

(72) Inventors: Miguel Angel Puente Pestaña, Madrid (ES); Ulf Mattsson, Kungsbacka (SE); Maria Belen Pancorbo Marcos, Madrid (ES); Miguel Angel Garcia Martin, Pozuelo de Alarcon (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 709 days.

(21) Appl. No.: 17/919,630

(22) PCT Filed: Jul. 1, 2020

(86) PCT No.: PCT/EP2020/068515
§ 371 (c)(1),
(2) Date: Oct. 18, 2022

(87) PCT Pub. No.: WO2021/233558
PCT Pub. Date: Nov. 25, 2021

(65) Prior Publication Data
US 2023/0148296 A1 May 11, 2023

(30) Foreign Application Priority Data
May 19, 2020 (EP) .................................... 20382425

(51) Int. Cl.
*H04W 60/00* (2009.01)
*H04W 8/18* (2009.01)
(Continued)

(52) U.S. Cl.
CPC .............. *H04W 60/06* (2013.01); *H04W 8/18* (2013.01); *H04W 76/25* (2018.02); *H04L 41/40* (2022.05)

(58) Field of Classification Search
None
See application file for complete search history.

(56) References Cited

U.S. PATENT DOCUMENTS

| | | | |
|---|---|---|---|
| 11,316,943 B2 | 4/2022 | Chen et al. | |
| 11,350,267 B2 | 5/2022 | Rodrigo et al. | |
| (Continued) | | | |

FOREIGN PATENT DOCUMENTS

| | | |
|---|---|---|
| CN | 105472594 A | 4/2016 |
| CN | 110351111 A | 10/2019 |
| (Continued) | | |

OTHER PUBLICATIONS

Ericsson, "23.502: UDM Services corrections and additions", SA WG2 Meeting #122, San Jose Del Cabo, Mexico, Jun. 26, 2017, pp. 1-11, S2-174360, 3GPP.
(Continued)

*Primary Examiner* — Willie J Daniel, Jr.
(74) *Attorney, Agent, or Firm* — Weisberg I.P. Law, P.A.

(57) ABSTRACT

A technique for maintaining a subscription of a subscriber Network Function, NF, for receiving events related to a User Equipment, UE, from a serving NF in a telecommunication system is disclosed, wherein the UE is served by a first instance of the serving NF. A method implementation of the technique is performed by the first instance of the serving NF and comprises receiving (S502) a subscription request from the subscriber NF, the subscription request including a persistence indication indicating that the subscription is to be maintained, triggering (S504) generating subscription restoration information enabling restoration of the subscrip-
(Continued)

Receive a subscription request from the subscriber NF, the subscription request including a persistence indication indicating that the subscription is to be maintained — S502

Trigger generating subscription restoration information enabling restoration of the subscription in case a first instance of the serving NF ceases serving the UE — S504

Triggering storing the subscription restoration information in a data storage function of the telecommunication system in association with the UE, wherein the subscription restoration information is to be used by a second instance of the serving NF for restoring the subscription if the first instance of the serving NF ceases serving the UE — S506 tion in case the first instance of the serving NF ceases serving the UE, and triggering (S506) storing the subscription restoration information in a data storage function of the telecommunication system in association with the UE, wherein the subscription restoration information is to be used by a second instance of the serving NF for restoring the subscription if the first instance of the serving NF ceases serving the UE.

25 Claims, 14 Drawing Sheets

(51) Int. Cl.
_H04W 60/06_ (2009.01)
_H04W 76/25_ (2018.01)
_H04L 41/40_ (2022.01)

(56) References Cited

U.S. PATENT DOCUMENTS

2016/0037472 A1 2/2016 Shi
2019/0349744 A1* 11/2019 Zong .................... H04W 8/065

FOREIGN PATENT DOCUMENTS

CN 111034238 A 4/2020
EP 2599340 A1 6/2013
WO 2019214343 A1 11/2019

OTHER PUBLICATIONS

3rd Generation Partnership Project, "3rd Generation Partnership Project; Technical Specification Group Services and System Aspects;

Study on enablers for network automation for the 5G System (5GS); Phase 2 (Release 17)", Technical Report, 3GPP TR 23.700-91 V0.3.0, Jan. 1, 2020, pp. 1-35, 3GPP.

3rd Generation Partnership Project, "3rd Generation Partnership Project; Technical Specification Group Services and System Aspects; Procedures for the 5G System (5GS); Stage 2 (Release 16)", Technical Specification, 3GPP TS 23.502 V16.3.0, Dec. 1, 2019, pp. 1-558, 3GPP.

3rd Generation Partnership Project, "3rd Generation Partnership Project; Technical Specification Group Services and System Aspects; Architecture enhancements for 5G System (5GS) to support network data analytics services (Release 16)", Technical Specification, 3GPP TS 23.288 V16.2.0, Dec. 1, 2019, pp. 1-57, 3GPP.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.3.0, Dec. 1, 2019, pp. 1-417, 3GPP.

3rd Generation Partnership Project, "3rd Generation Partnership Project; Technical Specification Group Services and System Aspects; Study on enhancement of network slicing; Phase 2 (Release 17)", Technical Report, 3GPP TR 23.700-40 V0.3.0, Jan. 1, 2020, pp. 1-62, 3GPP.

3rd Generation Partnership Project, "3rd Generation Partnership Project; Technical Specification Group Core Network and Terminals; 5G System; Network Data Analytics Services; Stage 3 (Release 16)", Technical Specification, 3GPP TS 29.520 V16.3.0, Mar. 1, 2020, pp. 1-83, 3GPP.

Ericsson, "Event exposure (NEF and UDM services)", SA WG2 Meeting #122, San Jose Del Cabo, Mexico, Jun. 26, 2017, pp. 1-10, S2-174361, 3GPP.

Ericsson, "KI#11, Persistent data collection subscriptions", SA WG2 Meeting #S2-140E, Electronic, Elbonia, Aug. 19, 2020, pp. 1-6, S2-2006267, 3GPP.

* cited by examiner

| Service Name | Service Operations | Operation Semantics | Example Consumer(s) |
|---|---|---|---|
| Nnwdaf_AnalyticsSubscription | Subscribe | Subscribe / Notify | PCF, NSSF, AMF, SMF |
| | Unsubscribe | | PCF, NSSF, AMF, SMF |
| | Notify | | PCF, NSSF, AMF, SMF |
| Nnwdaf_AnalyticsInfo | Request | Request / Response | PCF, NSSF, AMF, SMF |

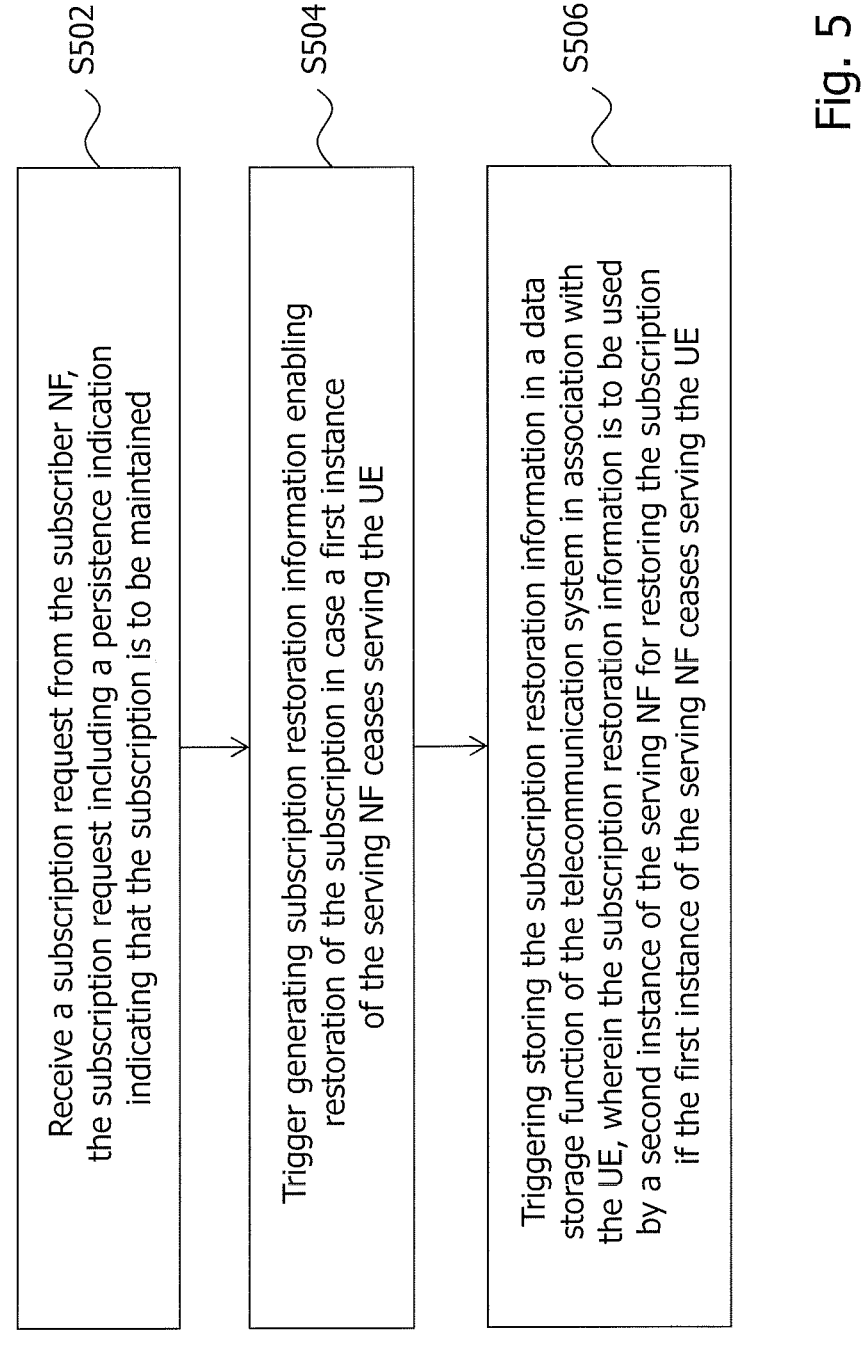

S502

Receive a subscription request from the subscriber NF, the subscription request including a persistence indication indicating that the subscription is to be maintained

S504

Trigger generating subscription restoration information enabling restoration of the subscription in case a first instance of the serving NF ceases serving the UE

S506

Triggering storing the subscription restoration information in a data storage function of the telecommunication system in association with the UE, wherein the subscription restoration information is to be used by a second instance of the serving NF for restoring the subscription if the first instance of the serving NF ceases serving the UE

Receive, from a data storage function of the telecommunication system which stores the subscription restoration information in association with the UE, subscription restoration information enabling restoration of the subscription

S604

Trigger restoring the subscription using the subscription restoration information Trigger sending a subscription request to the first instance of the serving NF, the subscription request including a persistence indication indicating that the subscription is to be maintained, the persistence indication causing the first instance of the serving NF to trigger generating subscription restoration information enabling restoration of the subscription in case the first instance of the serving NF ceases serving the UE, and to trigger storing the subscription restoration information in a data storage function of the telecommunication system in association with the UE, wherein the subscription restoration information is to be used by a second instance of the serving NF for restoring the subscription if the first instance of the serving NF ceases serving the UE

Figure 7:
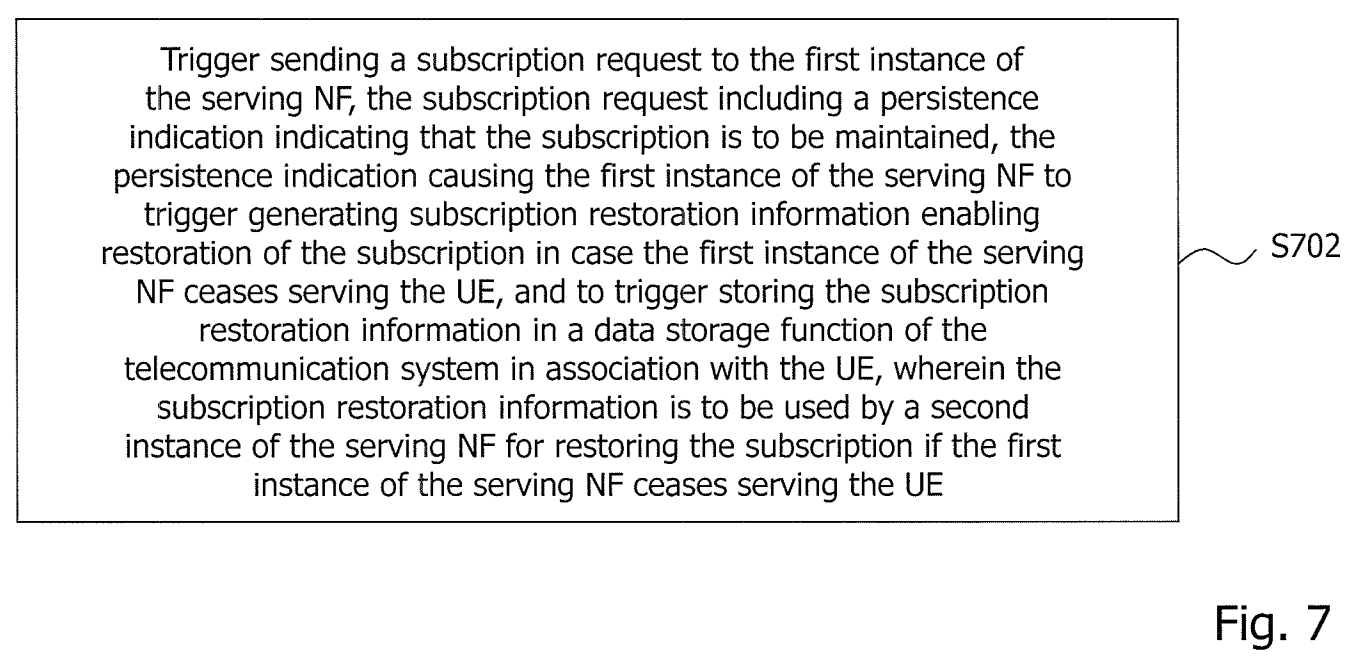

TECHNIQUE FOR MAINTAINING A SUBSCRIPTION OF A SUBSCRIBER NF

TECHNICAL FIELD

The present disclosure generally relates to telecommunication systems. In particular, a technique for maintaining a subscription of a subscriber Network Function (NF) for receiving events related to a User Equipment (UE) from a serving NF in a telecommunication system is presented. The technique may be embodied in methods, computer programs, apparatuses and systems.

BACKGROUND

Mobile communication systems of the fifth generation (5G), especially their Core Network (CN) architectures, generally make use of the Service Based Architecture (SBA) paradigm in which each NF may provide—as a "producer"—one or more "services" to one or more "consumers". FIG. 1 illustrates the general 3GPP reference architecture of 5G systems with particular focus on charging and analytics, which includes typical NFs of a 5G system like an Access and Mobility Management Function (AMF), a Session Management Function (SMF), a Policy Control Function (PCF), a Unified Data Management (UDM) function, a Unstructured Data Storage Function (UDSF), a Unified Data Repository (UDR), and a Network Data Analytics Function (NWDAF) for analytics purposes.

As illustrated in FIG. 2a, in such architecture, any NF is allowed to request network analytics information from the NWDAF via the Nnwdaf interface. The NWDAF belongs to the same Public Land Mobile Network (PLMN) in which the NF that consumes the analytics information is located. The Nnwdaf interface is defined for the NFs to request subscription to network analytics delivery for a particular context, to cancel subscription to network analytics delivery, and to request a specific network analytics report for a particular context, for example. FIG. 2b shows an overview of such services provided by the NWDAF in accordance with the SBA. Various analytics can be requested depending on the particular interest of the consumer, including slice load level, observed service experience, NF load, network performance, UE mobility, UE communication, user data congestion, and Quality of Service (QoS) sustainability, for example. These analytics are specified in 3GPP TS 23.288, such as 3GPP TS 23.288 v16.2.0, for example.

3GPP TS 23.288 generally defines a plurality of solutions for data collection from NFs for analytics purposes, which include generic management services offered by Operations, Administration and Maintenance (OAM), exposure services offered by NFs, and other NF services, such as Network Repository Function (NRF) services, for example. When data is collected from NFs via existing NF exposure services in order to produce UE related analytics services, such as via Event Exposure Services offered by AMFs, SMFs, PCFs or UDMs via their Namf, Nsmf, Npcf, Nudm interfaces (defined in 3GPP TS 23.502, such as 3GPP TS 23.502 v16.3.0, for example), the NWDAF may subscribe/unsubscribe at the relevant NFs to be notified on related events. This is schematically illustrated in FIG. 3.

The NWDAF must thus interact with the relevant NFs to request or subscribe to the exposure services for data collection and, in order to generate patterns from the collected user data, such as mobility or application usage patterns, the NWDAF may need to collect relevant user data continuously, such as several days, weeks, etc. During this time, however, the UE may attach/detach from the network, Protocol Data Unit (PDU) sessions may be established/released, and NFs allocated to the UE may change due to UE mobility, for example, such that the subscriptions to the exposure services may get lost over time.

Although 3GPP currently defines a procedure for AMF exposure services to allow that subscriptions to events in an AMF are transferred to another AMF in case the UE moves and gets reallocated to the other AMF, such procedure only provides a solution for the mobility problem with respect to AMFs. However, such solution does not allow maintaining subscriptions if the UE deregisters and reregisters with the network or if PDU sessions are entirely released and reestablished, in which case all event subscriptions will generally be lost. Also, such solution does not allow maintaining subscriptions if an SMF and UPF allocated to a PDU session are reassigned due to mobility of the UE to a closer SMF and UPF, for example. In these cases, the NWDAF will no longer get any notifications for data collection and it will not be able to provide accurate analytics reports anymore.

SUMMARY

Accordingly, there is a need for a technique for maintaining a subscription of a subscriber NF that avoids one or more of these problems, or other problems.

According to a first aspect, a method for maintaining a subscription of a subscriber NF for receiving events related to a UE from a serving NF in a telecommunication system is provided, wherein the UE is served by a first instance of the serving NF. The method is performed by the first instance of the serving NF and comprises receiving a subscription request from the subscriber NF, the subscription request including a persistence indication indicating that the subscription is to be maintained, triggering generating subscription restoration information enabling restoration of the subscription in case the first instance of the serving NF ceases serving the UE, and triggering storing the subscription restoration information in a data storage function of the telecommunication system in association with the UE, wherein the subscription restoration information is to be used by a second instance of the serving NF for restoring the subscription if the first instance of the serving NF ceases serving the UE.

The subscription restoration information may be stored as part of a context maintained for the UE in the telecommunication system. Ceasing serving the UE may occur due to the UE being temporarily unconnected to the telecommunication system, wherein the first instance of the serving NF and the second instance of the serving NF are the same. Also, the first instance of the serving NF may cease serving the UE due to a reallocation of the serving NF from the first instance of the serving NF to the second instance of the serving NF, wherein the first instance of the serving NF and the second instance of the serving NF are different. The method may further comprise triggering transferring the subscription restoration information to the second instance of the serving NF, optionally as part of a context of the UE transferred to the second instance of the serving NF during the reallocation. The method may further comprise triggering notifying the subscriber NF that the second instance of the serving NF now serves the UE. Storing the subscription restoration information in the data storage function of the telecommunication system may be carried out via the subscriber NF.

According to a second aspect, a method for maintaining a subscription of a subscriber NF for receiving events related to a UE from a serving NF in a telecommunication system is provided, wherein the UE is served by a second instance of the serving NF, wherein the UE was previously served by a first instance of the serving NF which has ceased serving the UE and wherein the subscription was previously established with the first instance of the serving NF. The method is performed by the second instance of the serving NF and comprises receiving, from a data storage function of the telecommunication system which stores the subscription restoration information in association with the UE, subscription restoration information enabling restoration of the subscription, and triggering restoring the subscription using the subscription restoration information.

The method according to the second aspect may define a method from the perspective of a second instance of the serving NF described above in relation to the method according to the first aspect. As in the method of the first aspect, ceasing serving the UE may have occurred due to the UE being temporarily unconnected to the telecommunication system, wherein the first instance of the serving NF and the second instance of the serving NF are the same. Also, the first instance of the serving NF may have ceased serving the UE due to a reallocation of the serving NF from the first instance of the serving NF to the second instance of the serving NF, wherein the first instance of the serving NF and the second instance of the serving NF are different. The subscription restoration information may be stored as part of a context maintained for the UE in the telecommunication system. The method may further comprise triggering notifying the subscriber NF that the second instance of the serving NF now serves the UE. The method may further comprise triggering generating updated subscription restoration information enabling restoration of the subscription in case the second instance of the serving NF ceases serving the UE, and triggering storing the updated subscription restoration information in the data storage function of the telecommunication system in association with the UE, wherein the updated subscription restoration information is to be used by a third instance of the serving NF for restoring the subscription if the second instance of the serving NF ceases serving the UE.

According to a third aspect, a method for maintaining a subscription of a subscriber NF for receiving events related to a UE from a serving NF in a telecommunication system is provided, wherein the UE is served by a first instance of the serving NF. The method is performed by the subscriber NF and comprises triggering sending a subscription request to the first instance of the serving NF, the subscription request including a persistence indication indicating that the subscription is to be maintained, the persistence indication causing the first instance of the serving NF to trigger generating subscription restoration information enabling restoration of the subscription in case the first instance of the serving NF ceases serving the UE, and to trigger storing the subscription restoration information in a data storage function of the telecommunication system in association with the UE, wherein the subscription restoration information is to be used by a second instance of the serving NF for restoring the subscription if the first instance of the serving NF ceases serving the UE.

The method according to the third aspect may define a method from the perspective of a subscriber NF described above in relation to the at least one of the methods according to the first and the second aspect. As in the method of the first and second aspects, the subscription restoration information may be to be stored as part of a context maintained for the UE in the telecommunication system. Storing the subscription restoration information in the data storage function of the telecommunication system may be to be carried out via the subscriber NF. When ceasing serving the UE occurs due to the UE being temporarily unconnected to the telecommunication system, the first instance of the serving NF and the second instance of the serving NF may be the same. When the first instance of the serving NF ceases serving the UE due to a reallocation of the serving NF from the first instance of the serving NF to the second instance of the serving NF, the first instance of the serving NF and the second instance of the serving NF may be different. The method may further comprise, when the first instance of the serving NF ceases serving the UE, receiving a notification informing the subscriber NF that the second instance of the serving NF now serves the UE. The notification may be received from at least one of the first instance of the serving NF, the second instance of the serving NF, and the data storage function of the telecommunication system.

According to a fourth aspect, a method for maintaining a subscription of a subscriber NF for receiving events related to a UE from a serving NF in a telecommunication system is provided, wherein the UE is served by a first instance of the serving NF. The method is performed by a data storage function of the telecommunication system and comprises receiving a request to store subscription restoration information in association with the UE, the subscription restoration information enabling restoration of the subscription in case the first instance of the serving NF ceases serving the UE, triggering storing the subscription restoration information, and triggering providing the stored subscription restoration information to a second instance of the serving NF, wherein the subscription restoration information is to be used by the second instance of the serving NF for restoring the subscription if the first instance of the serving NF ceases serving the UE.

The method according to the fourth aspect may define a method from the perspective of a data storage function described above in relation to the at least one of the methods according to the first, the second and the third aspect. As in the method of the first, second and third aspects, the subscription restoration information may be stored as part of a context maintained for the UE in the telecommunication system. The request to store subscription restoration information may be received from the first instance of the serving NF, optionally via the subscriber NF. When ceasing serving the UE occurs due to the UE being temporarily unconnected to the telecommunication system, the first instance of the serving NF and the second instance of the serving NF may be the same. When the first instance of the serving NF ceases serving the UE due to a reallocation of the serving NF from the first instance of the serving NF to the second instance of the serving NF, the first instance of the serving NF and the second instance of the serving NF may be different. The method may further comprise triggering notifying the subscriber NF that the second instance of the serving NF now serves the UE.

According to a fifth aspect, a computer program product is provided. The computer program product comprises program code portions for performing the method of at least one of the first, second, third and fourth aspect when the computer program product is executed on one or more computing devices (e.g., a processor or a distributed set of processors). The computer program product may be stored on a computer readable recording medium, such as a semiconductor memory, DVD, CD-ROM, and so on.

According to a sixth aspect, a computing unit configured to execute a first instance of a serving NF for maintaining a subscription of a subscriber NF for receiving events related to a UE from the serving NF in a telecommunication system is provided, wherein the UE is served by a first instance of the serving NF. The computing unit comprises at least one processor and at least one memory, wherein the at least one memory contains instructions executable by the at least one processor such that the first instance of the serving NF is operable to perform any of the method steps presented herein with respect to the first aspect.

According to a seventh aspect, a computing unit config-ured to execute a second instance of a serving NF for maintaining a subscription of a subscriber NF for receiving events related to a UE from the serving NF in a telecom-munication system is provided, wherein the UE is served by the second instance of the serving NF, wherein the UE was previously served by a first instance of the serving NF which has ceased serving the UE and wherein the subscription was previously established with the first instance of the serving NF. The computing unit comprises at least one processor and at least one memory, wherein the at least one memory contains instructions executable by the at least one processor such that the second instance of the serving NF is operable to perform any of the method steps presented herein with respect to the second aspect.

According to an eighth aspect, a computing unit config-ured to execute a subscriber NF for maintaining a subscrip-tion of the subscriber NF for receiving events related to a UE from a serving NF in a telecommunication system is pro-vided, wherein the UE is served by a first instance of the serving NF. The computing unit comprises at least one processor and at least one memory, wherein the at least one memory contains instructions executable by the at least one processor such that the subscriber NF is operable to perform any of the method steps presented herein with respect to the third aspect.

According to a ninth aspect, a computing unit configured to execute a data storage function of a telecommunication system for maintaining a subscription of a subscriber NF for receiving events related to a UE from a serving NF in the telecommunication system is provided, wherein the UE is served by a first instance of the serving NF. The computing unit comprises at least one processor and at least one memory, wherein the at least one memory contains instruc-tions executable by the at least one processor such that the data storage function is operable to perform any of the method steps presented herein with respect to the fourth aspect.

According to a tenth aspect, there is provided a system comprising a computing unit according to the sixth aspect, a computing unit according to the seventh aspect, a com-puting unit according to the eighth aspect, and a computing unit according to the ninth aspect.

BRIEF DESCRIPTION OF THE DRAWINGS

Implementations of the technique presented herein are described herein below with reference to the accompanying drawings, in which:

FIG. 5 illustrates a method which may be performed by the first instance of the serving NF according to the present disclosure;

FIG. 7 illustrates a method which may be performed by the subscriber NF according to the present disclosure;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using soft-ware functioning in conjunction with a programmed micro-processor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
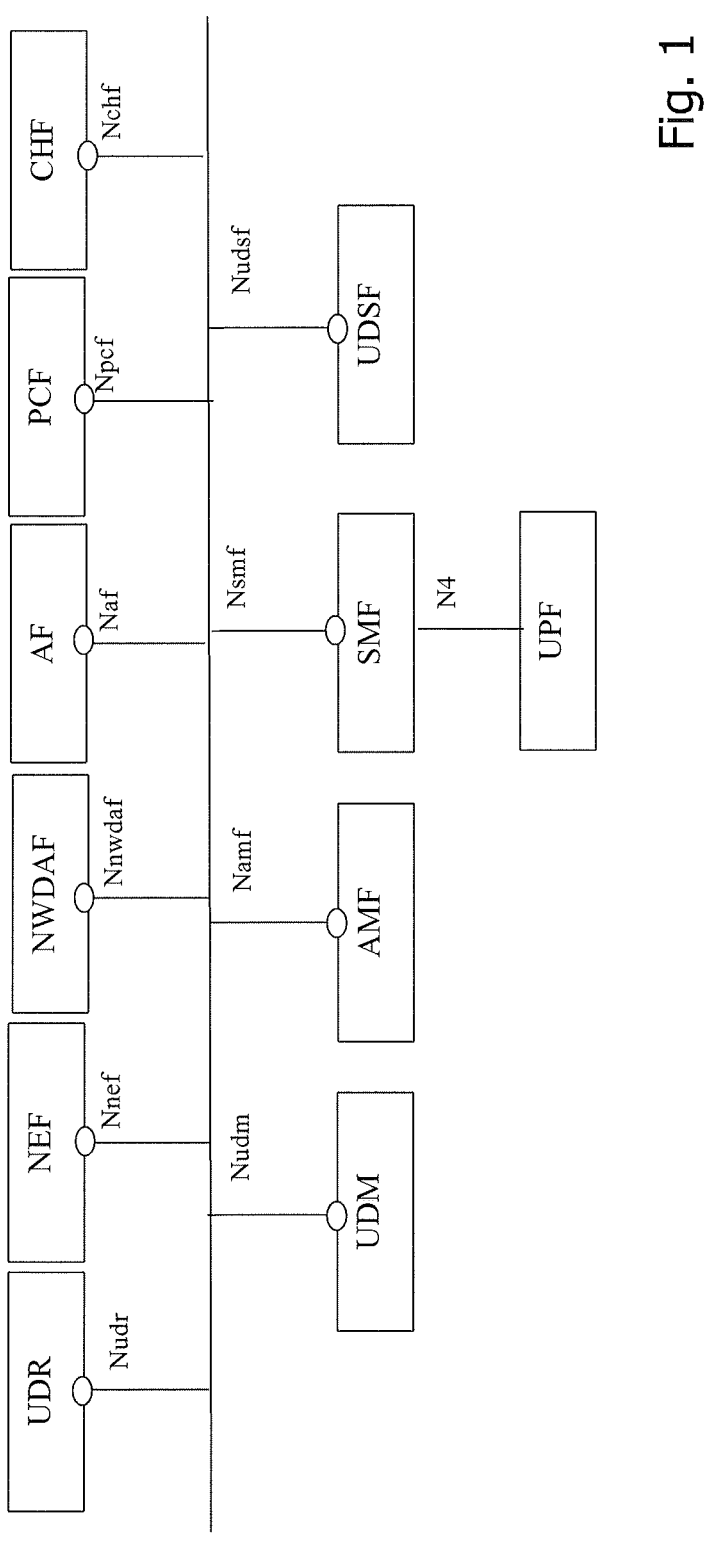
FIG. 1 illustrates an overview of the general 3GPP reference architecture of 5G systems with focus on charging and analytics.
Figures 2A, 2B:
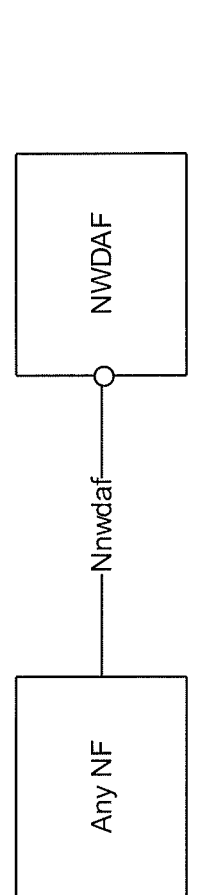
FIGS. 2a and 2b illustrate an overview of the Nnwdaf interface and services provided by the NWDAF via the Nnwdaf interface.
Figure 3:
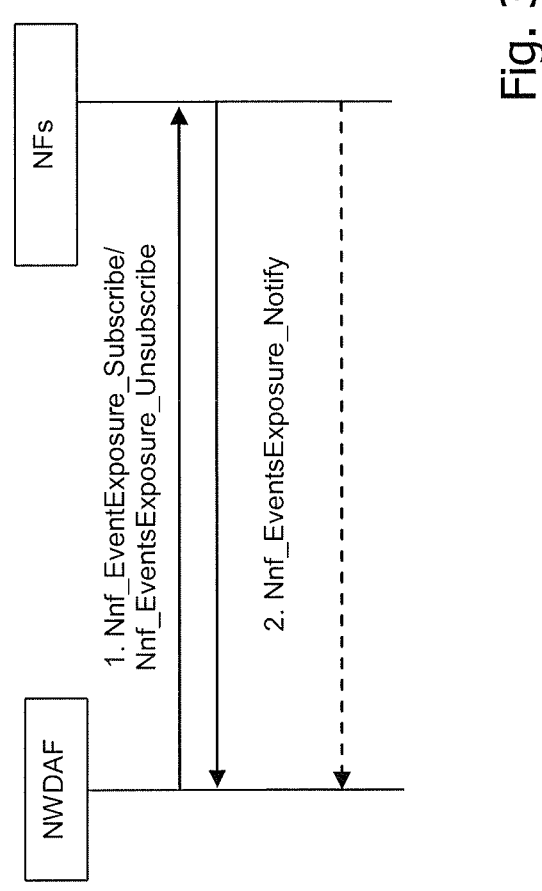
FIG. 3 illustrates an NWDAF subscribing to Event Expo-sure Services offered by NFs, such as AMFs, SMFs, PCFs or UDMs, etc., for data collection.
Figures 4A, 4B, 4C, 4D:
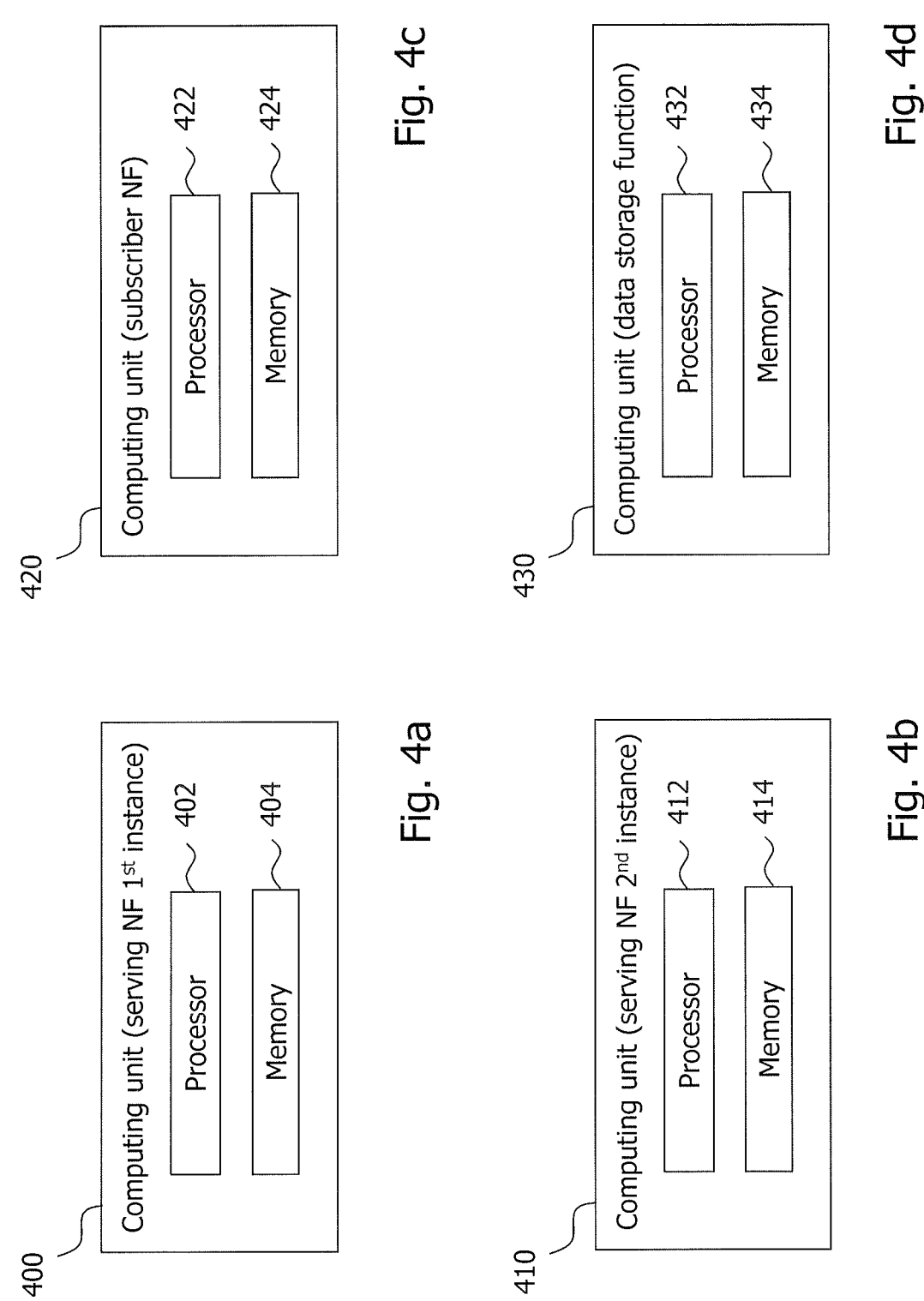
FIGS. 4a to 4d illustrate exemplary compositions of a computing unit configured to execute a first instance of a serving NF, a computing unit configured to execute a second instance of a serving NF, a computing unit configured to execute a subscriber NF, and a computing unit configured to execute a data storage function of a telecommunication system according to the present disclosure.

FIG. 4a schematically illustrates an exemplary composi-tion of a computing unit 400 configured to execute a first instance of a serving NF for maintaining a subscription of a subscriber NF for receiving events related to a UE from the serving NF in a telecommunication system, wherein the UE is served by a first instance of the serving NF. The computing unit 400 comprises at least one processor 402 and at least one memory 404, wherein the at least one memory 404 contains instructions executable by the at least one processor 402 such that the first instance of the serving NF is operable to carry out the method steps described herein below with reference to the first instance of the serving NF.

FIG. 4b schematically illustrates an exemplary composition of a computing unit 410 configured to execute a second instance of a serving NF for maintaining a subscription of a subscriber NF for receiving events related to a UE from the serving NF in a telecommunication system, wherein the UE is served by the second instance of the serving NF, wherein the UE was previously served by a first instance of the serving NF which has ceased serving the UE and wherein the subscription was previously established with the first instance of the serving NF. The computing unit 410 comprises at least one processor 412 and at least one memory 414, wherein the at least one memory 414 contains instructions executable by the at least one processor 412 such that the second instance of the serving NF is operable to carry out the method steps described herein below with reference to the second instance of the serving NF.

FIG. 4c schematically illustrates an exemplary composition of a computing unit 420 configured to execute a subscriber NF for maintaining a subscription of the subscriber NF for receiving events related to a UE from a serving NF in a telecommunication system, wherein the UE is served by a first instance of the serving NF. The computing unit 420 comprises at least one processor 422 and at least one memory 424, wherein the at least one memory 424 contains instructions executable by the at least one processor 422 such that the subscriber NF is operable to carry out the method steps described herein below with reference to the subscriber NF.

FIG. 4d schematically illustrates an exemplary composition of a computing unit 430 configured to execute a data storage function of a telecommunication system for maintaining a subscription of a subscriber NF for receiving events related to a UE from a serving NF in the telecommunication system, wherein the UE is served by a first instance of the serving NF. The computing unit 430 comprises at least one processor 432 and at least one memory 434, wherein the at least one memory 434 contains instructions executable by the at least one processor 432 such that the data storage function is operable to carry out the method steps described herein below with reference to the data storage function of the telecommunication system.

It will be understood that each of the computing unit 400, the computing unit 410, the computing unit 420 and the computing unit 430 may be implemented on a physical computing unit or a virtualized computing unit, such as a virtual machine, for example. It will further be appreciated that each of the computing unit 400, the computing unit 410, the computing unit 420 and the computing unit 430 may not necessarily be implemented on a standalone computing unit, but may be implemented as components—realized in software and/or hardware—residing on multiple distributed computing units as well, such as in a cloud computing environment, for example.

FIG. 5 illustrates a method which may be performed by the first instance of the serving NF executed on the computing unit 400. The method is dedicated to maintaining a subscription of a subscriber NF (e.g., the subscriber NF executed on the computing unit 420) for receiving events related to a UE from a serving NF in a telecommunication system, wherein the UE is served by the first instance of the serving NF. In step S502, the first instance of the serving NF may receive a subscription request from the subscriber NF, the subscription request including a persistence indication indicating that the subscription is to be maintained. In step S504, the first instance of the serving NF may trigger generating subscription restoration information enabling restoration of the subscription in case the first instance of the serving NF ceases serving the UE. In step S506, the first instance of the serving NF may trigger storing the subscription restoration information in a data storage function of the telecommunication system (e.g., the data storage function executed on the computing unit 430) in association with the UE, wherein the subscription restoration information is to be used by a second instance of the serving NF (e.g., the second instance of the serving NF executed on the computing unit 410) for restoring the subscription if the first instance of the serving NF ceases serving the UE.

The serving NF may be any NF which serves the UE in the telecommunication system to provide connectivity to the UE, especially an NF of the CN of the telecommunication system, such as an AMF, an SMF, a PCF or a UPF when the telecommunication system is a 5G system, for example. It will be understood that the telecommunication system may not be limited 5G systems but may also be given by systems of other generations, such as 4G systems, in which case the serving NF may be a Mobility Management Entity (MME) or a Packet Data Network (PDN) Gateway (PGW), for example. The serving NF may support a service to provide UE related events to other NFs on a subscription basis (such service will in the following be denoted as "event exposure service") and the subscriber NF may subscribe at the serving NF to receive events related to the UE accordingly. The subscriber NF may subscribe to the event exposure service of the serving NF to collect UE related data in order to carry out UE related analytics in the telecommunication system. The subscriber NF may thus be an NF responsible for UE related analytics in the telecommunication system and, as such, the subscriber NF may be an NWDAF when the telecommunication system is a 5G system, for example. The subscriber NF may subscribe to the event exposure service of the serving NF for one UE or for a whole group of UEs.

As described above, subscriptions to an event exposure service may be lost in certain situations, such as in case the UE deregisters and registers again with the telecommunication system (e.g., due to UE loss of connectivity), in case the UE moves and the current instance of the serving NF needs to be reallocated to another instance of the serving NF which is closer to the UE (e.g., an UPF assigned to a PDU session being reassigned to a UPF closer to the UE), or in case of other changes of the serving NF (e.g., a replacement of an instance of the serving NF by another instance of the serving NF in case of NF failure), for example. In order to maintain the subscription of the subscriber NF with the serving NF over time, i.e., even in case of situations of subscription loss, the event subscription context may be made persistent in the telecommunication system to thereby allow restoring the subscription in case of subscription loss events, no matter whether the subscription is resumed by the same instance of the serving NF or by another instance of the serving NF.

To this end, when the subscriber NF subscribes at the first instance of the serving NF to receive the events related to the UE, the subscriber NF may send a subscription request to the first instance of the serving NF in accordance with step S502. In the subscription request, a persistence indication may be included which indicates that the subscription is to be maintained, e.g., as long as the UE is served by any instance of the serving NF, or at least when the first instance of the serving NF ceases serving the UE and the second instance of the serving NF takes over serving the UE. In other words, the persistence indication (which may be a flag in the subscription request, for example) may indicate the subscriber NF's desire that the subscription survives subscription loss events, such as NF reallocation and UE reregistration, as described above.

In order to make the event subscription context persistent, subscription restoration information enabling restoration of the subscription in case the first instance of the serving NF ceases serving the UE may be stored such that it is accessible by a second instance of the serving NF once the cause of the subscription loss event is resolved and the second instance of the serving NF takes over serving the UE in the telecommunication system to provide connectivity to the UE. In accordance with step S504, the first instance of the serving NF may thus generate (or trigger generating) subscription restoration information enabling restoration of the subscription in case the first instance of the serving NF ceases serving the UE, and store (or trigger storing) the generated subscription restoration information in a data storage function of the telecommunication system in association with the UE, so that the subscription restoration information may be retrieved from the data storage function based on information relating to the UE by the second instance of the serving NF later on. The subscription restoration information may then be used by the second instance of the serving NF to restore the subscription and resume the subscription accordingly. The subscription restoration information will in the following sometimes also be denoted as "event subscription context" and may include all subscription details which are necessary for restoring (or "recreating"/"reinstantiating") the subscription, such as at least one of an identifier of the UE (or a group identifier in case of a group of UEs), the subscribed event (or type of event), the endpoint identifying the subscriber NF (e.g., a network address of the subscriber NF), and the notification endpoint identifying the NF to which notifications are to be sent (e.g., a network address of the NF receiving the notifications; this NF may be the subscriber NF or, in variants supporting third-party subscriptions, another NF on behalf of which the subscriber NF subscribes), for example.

As said, the subscription restoration information may be stored in the data storage function in association with the UE so that the subscription restoration information may be retrievable by the second instance of the serving NF based on information relating to the UE, such as a UE identifier, for example. In one variant, the subscription restoration information may be stored as part the UE context in the data storage function or, more generally said, the subscription restoration information may be stored as part of a context maintained for the UE in the telecommunication system. The data storage function of the telecommunication system may be an NF which is responsible for storing user or UE related data in the telecommunication system and, as such, the data storage function may be (or comprise) at least one of a UDM, a UDR or a UDSF when the telecommunication system is a 5G system, for example. The UE context may be stored in the data storage function and the subscription restoration information may be stored as an event subscription context as part of the UE context accordingly. When the first instance of the serving NF thus receives an initial subscription to events for a UE or group of UEs including a persistence indication, the first instance of the serving NF may locally store the generated event subscription context as part of the UE context and then store the event subscription context in the data storage function to make it persistent and accessible for other instances of the serving NF in the telecommunication system, as described above.

As said, the event subscription context may allow restoring the subscription in case of subscription loss events, no matter whether the subscription is resumed by the same instance of the serving NF or by another instance of the serving NF. Resuming the subscription by the same instance of the serving NF may occur in case of temporary UE loss of connectivity, i.e., when the instance of the serving NF does not need to be changed. Thus, in one variant, when ceasing serving the UE occurs due to the UE being temporarily unconnected to the telecommunication system (e.g., due to UE loss of connectivity and/or UE deregistration and reregistration), the first instance of the serving NF and the second instance of the serving NF may be the same. Resuming the subscription by another instance of the serving NF, on the other hand, may occur in case a reallocation to another serving NF instance takes place. Thus, in another variant, when the first instance of the serving NF ceases serving the UE due to a reallocation of the serving NF from the first instance of the serving NF to the second instance of the serving NF, the first instance of the serving NF and the second instance of the serving NF may be different.

In the latter case, the first instance of the serving NF may also be denoted as transferor NF and the second instance of the serving NF may be denoted as transferee NF. To transfer the subscription restoration information to the transferee NF, the transferee NF may in one variant not only receive the subscription restoration information from the data storage function, but may also receive the subscription restoration information directly from the transferor NF. For example, the transferor NF may transfer the UE context to the transferee NF as part of the reallocation and the event subscription context may be included in the UE context. The method performed by the first instance of the serving NF may thus also comprise transferring (or triggering transferring) the subscription restoration information to the second instance of the serving NE, optionally as part of a context of the UE transferred to the second instance of the serving NF during the reallocation.

The transferor NF may also notify the subscriber NF of the reallocation to the transferee NF in order to thereby enable the subscriber NF to address messages to the NF that is currently producing event notifications (e.g., to enable the subscriber NF to cancel the subscription at a later point of time). The method performed by the first instance of the serving NF may thus further comprise notifying (or triggering notifying) the subscriber NF that the second instance of the serving NF now serves the UE.

It will be understood that variations of the above-described message flows are generally conceivable. For example, the notification that the transferee NF now serves the UE, may also be sent to the subscriber NF by the transferee NF or by the data storage function instead of the transferor NF. As another example, storing the subscription restoration information in the data storage function may not only be carried out by the first instance of the serving NF interacting directly with the data storage function, as described above, but instead via the subscriber NF. In such variant, once the first instance of the serving NF has generated the subscription restoration information, it may pass on this information to the subscriber NF, which may then eventually store the subscription restoration information in the data storage function by sending a corresponding storage request to the data storage function. In such a case, the subscriber NF may be said to store the event subscription context in the data storage function on behalf of the first instance of the serving NF.

Figure 6:
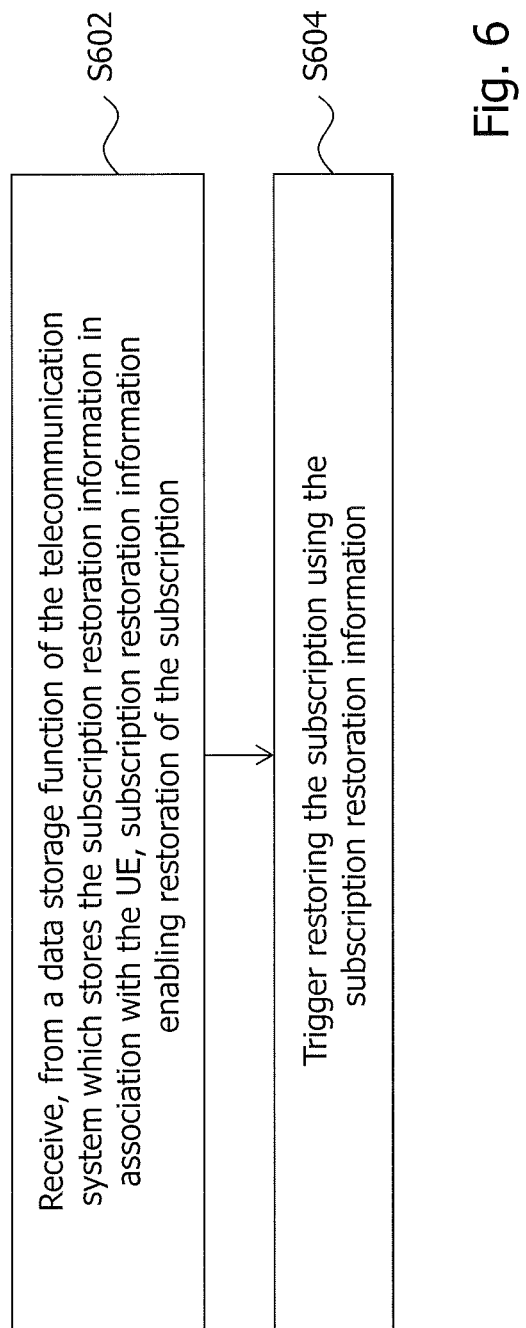
FIG. 6 illustrates a method which may be performed by the second instance of the serving NF according to the present disclosure.

FIG. 6 illustrates a method which may be performed by the second instance of the serving NF executed on the computing unit 410. The method is dedicated to maintaining a subscription of a subscriber NF (e.g., the subscriber NF executed on the computing unit 420) for receiving events related to a UE from a serving NF in a telecommunication system, wherein the UE is served by the second instance of the serving NF, wherein the UE was previously served by a first instance of the serving NF (e.g., the first instance of the serving NF executed on the computing unit 400) which has ceased serving the UE and wherein the subscription was previously established with the first instance of the serving NF. The method of FIG. 6 may define a method from the perspective of the second instance of the serving NF described above in relation to FIG. 5 and, as such, aspects of the functions described above may be applicable to the corresponding functions described in the following as well, and vice versa. Unnecessary repetitions are thus omitted in the following.

In step S602, the second instance of the serving NF may receive, from a data storage function of the telecommunication system (e.g., the data storage function executed on computing unit 430) which stores the subscription restoration information in association with the UE, subscription restoration information enabling restoration of the subscription. In step S604, the second instance of the serving NF may restore (or trigger restoring) the subscription using the subscription restoration information.

The method of FIG. 6 relates to a method which may be performed when the second instance of the serving NF is elected to serve the UE or group of UEs. In accordance with step S602, the second instance of the serving NF may retrieve the subscription restoration information for this UE or group of UEs from the data storage function of the telecommunication system, e.g., based on information relating to the UE, such as a UE identifier, for example. Alternatively, as described above, if a reallocation takes place from a transferor NF to a transferee NF, the second instance of the serving NF may also receive the subscription restoration information directly from the first instance of the serving NF, optionally as part of a context of the UE transferred from the first instance of the serving NF to the second instance of the serving NF during the reallocation.

Once retrieved, the second instance of the serving NF may locally store the retrieved subscription restoration information and use it thereafter in accordance with step S604 to restore (or "recreate"/"reinstantiate") the subscription according to the details included in the subscription restoration information, in order to produce event notifications for the subscriber NF going forward. In this way, the subscription may be resumed (e.g., after a short interruption when the first instance of the serving NF has ceased serving the UE) and the subscription may thereby be maintained over time, e.g., as long as the UE is served by any instance of the serving NF, or at least when the first instance of the serving NF ceases serving the UE and the second instance of the serving NF takes over serving the UE.

After the subscription has been restored, the current event subscription context may be stored anew in the data storage function, i.e., in other words, the second instance of the serving NF may store the new event subscription context in the data storage function of the telecommunication system in order to thereby allow restoring the subscription in case of further subscription loss events (e.g., due to UE loss of connectivity, UE deregistration/reregistration, or serving NF failure, etc.) to occur in the future. The method performed by the second instance of the serving NF may thus further comprise generating (or triggering generating) updated subscription restoration information enabling restoration of the subscription in case the second instance of the serving NF ceases serving the UE, and storing (or triggering storing) the updated subscription restoration information in the data storage function of the telecommunication system in association with the UE, wherein the updated subscription restoration information is to be used by a third instance of the serving NF for restoring the subscription if the second instance of the serving NF ceases serving the UE.

As described above in relation to FIG. 5, ceasing serving the UE may have occurred due to the UE being temporarily unconnected to the telecommunication system, wherein the first instance of the serving NF and the second instance of the serving NF are the same. In another variant, the first instance of the serving NF may have ceased serving the UE due to a reallocation of the serving NF from the first instance of the serving NF to the second instance of the serving NF, wherein the first instance of the serving NF and the second instance of the serving NF are different. The subscription restoration information may be stored as part of a context maintained for the UE in the telecommunication system. The method performed by the second instance of the serving NF may also comprise triggering notifying the subscriber NF that the second instance of the serving NF now serves the UE.

When a subscription expires in time, the second instance of the serving NF may locally delete the subscription restoration information and may also delete the subscription restoration information from the data storage function of the telecommunication system since, due to the subscription expiry, such event subscription context may no longer be needed. It will be understood that, alternatively, the deletion of the subscription restoration information from the data storage function may also be performed by the subscriber NF instead of the second instance of the serving NF, for example.

FIG. 7 illustrates a method which may be performed by the subscriber NF executed on the computing unit 420. The method is dedicated to maintaining a subscription of the subscriber NF for receiving events related to a UE from a serving NF in a telecommunication system, wherein the UE is served by a first instance of the serving NF (e.g., the first instance of the serving NF executed on the computing unit 400). The method of FIG. 7 may define a method from the perspective of the subscriber NF described above in relation to FIGS. 5 and 6 and, as such, aspects of the functions described above may be applicable to the corresponding functions described in the following as well, and vice versa. Unnecessary repetitions are thus omitted in the following.

In step S702, the subscriber NF may send (or trigger sending) a subscription request to the first instance of the serving NF, the subscription request including a persistence indication indicating that the subscription is to be maintained, the persistence indication causing the first instance of the serving NF to trigger generating subscription restoration information enabling restoration of the subscription in case the first instance of the serving NF ceases serving the UE, and to trigger storing the subscription restoration information in a data storage function of the telecommunication system (e.g., the data storage function executed on the computing unit 430) in association with the UE, wherein the subscription restoration information is to be used by a second instance of the serving NF (e.g., the second instance of the serving NF executed on the computing unit 410) for restoring the subscription if the first instance of the serving NF ceases serving the UE.

As in the methods of FIGS. 5 and 6, the subscription restoration information may be to be stored as part of a context maintained for the UE in the telecommunication system. Storing the subscription restoration information in the data storage function of the telecommunication system may be to be carried out via the subscriber NF. When ceasing serving the UE occurs due to the UE being temporarily unconnected to the telecommunication system, the first instance of the serving NF and the second instance of the serving NF may be the same. When the first instance of the serving NF ceases serving the UE due to a reallocation of the serving NF from the first instance of the serving NF to the second instance of the serving NF, the first instance of the serving NF and the second instance of the serving NF may be different. The method performed by the subscriber NF may further comprise, when the first instance of the serving NF ceases serving the UE, receiving a notification informing the subscriber NF that the second instance of the serving NF now serves the UE. The notification may be received from at least one of the first instance of the serving NF, the second instance of the serving NF, and the data storage function of the telecommunication system.

Figure 8:
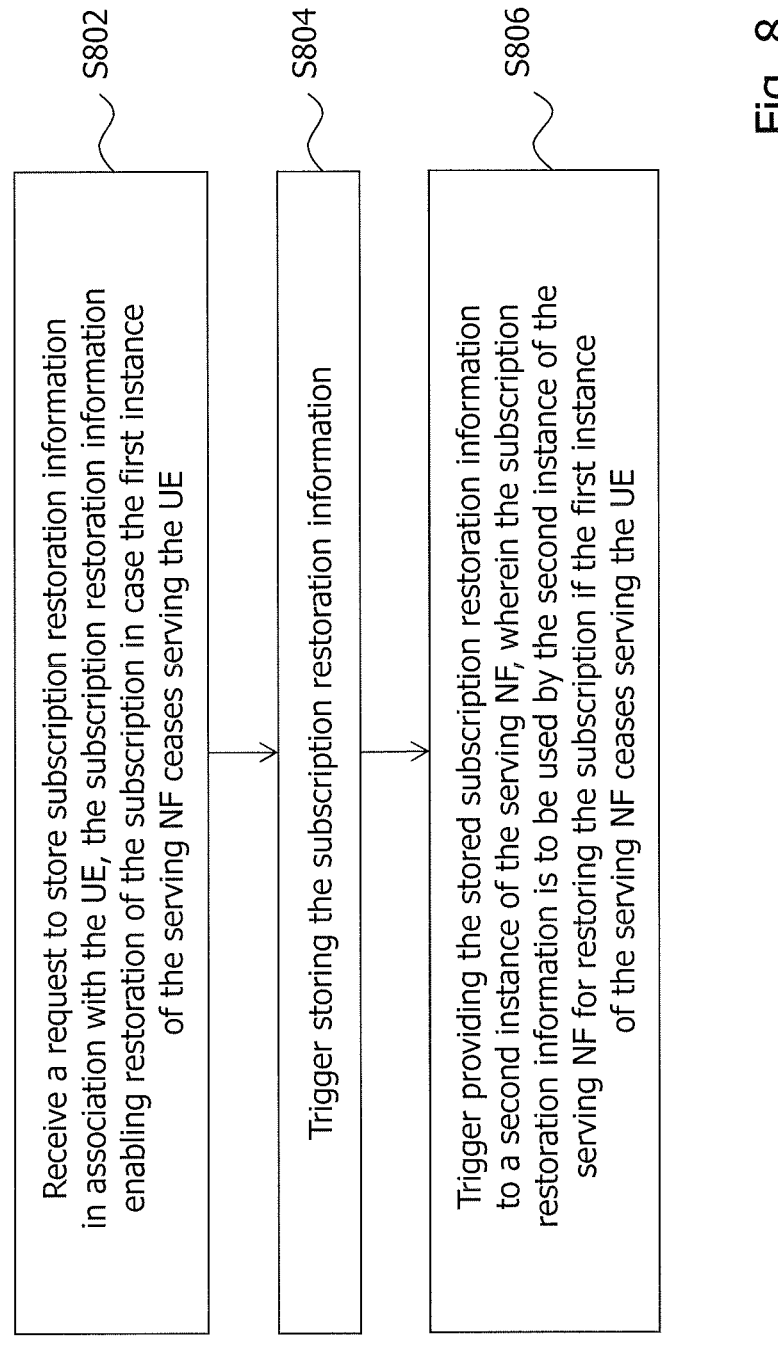
FIG. 8 illustrates a method which may be performed by the data storage function of the telecommunication system according to the present disclosure.

FIG. 8 illustrates a method which may be performed by the data storage function of the telecommunication system executed on the computing unit 430. The method is dedicated to maintaining a subscription of a subscriber NF (e.g., the subscriber NF executed on the computing unit 420) for receiving events related to a UE from a serving NF in a telecommunication system, wherein the UE is served by a first instance of the serving NF (e.g., the first instance of the serving NF executed on the computing unit 400). The method of FIG. 8 may define a method from the perspective of the data storage function described above in relation to FIGS. 5 to 7 and, as such, aspects of the functions described above may be applicable to the corresponding functions described in the following as well, and vice versa. Unnecessary repetitions are thus omitted in the following.

In step S802, the data storage function may receive a request to store subscription restoration information in association with the UE, the subscription restoration information enabling restoration of the subscription in case the first instance of the serving NF ceases serving the UE. In step S804, the data storage function may store (or trigger storing) the subscription restoration information (i.e., in the data storage function, in association with the UE). In step S806, the data storage function may provide (or trigger providing) the stored subscription restoration information to a second instance of the serving NF (e.g., the second instance of the serving NF executed on the computing unit 410), wherein the subscription restoration information is to be used by the second instance of the serving NF for restoring the subscription if the first instance of the serving NF ceases serving the UE.

As in the method of FIGS. 5 to 7, the subscription restoration information may be stored as part of a context maintained for the UE in the telecommunication system. The request to store subscription restoration information may be received from the first instance of the serving NF, optionally via the subscriber NF. When ceasing serving the UE occurs due to the UE being temporarily unconnected to the telecommunication system, the first instance of the serving NF and the second instance of the serving NF may be the same. When the first instance of the serving NF ceases serving the UE due to a reallocation of the serving NF from the first instance of the serving NF to the second instance of the serving NF, the first instance of the serving NF and the second instance of the serving NF may be different.

When the data storage function receives a request to store subscription restoration information (e.g., due to the selection of a new instance of the serving NF, such as when the UE registers anew, or due to a transfer of the UE context to another instance of the serving NF when the UE is already registered, etc.) the data storage function may notify the subscriber NF of this change. The method performed by the data storage function may thus further comprise triggering notifying the subscriber NF that the second instance of the serving NF now serves the UE. This may allow the subscriber NF to have updated information of which serving NF instance is actively in charge of the subscription at that time, e.g., if the subscriber NF needs to cancel the subscription for the given UE or a group of UEs.

In the following, reference will be made to FIGS. 9 to 14 which exemplify the technique presented herein in more illustrative form, following four exemplary embodiments in which the subscriber NF is given by a NWDAF and the data storage function is given by at least one of a UDM, UDR and UDSF (in the following denoted as "UDM/UDR/UDSF"), i.e., the data storage function may be given by one of a UDM, UDR and UDSF, or any combination or subcombination thereof. It will be understood that the specifics of these embodiments are provided for purposes of explanation only and are not to be understood to be limiting beyond the above more general description of the presented technique. The first embodiment is described with reference to FIGS. 9 to 11, and the second, third and fourth embodiments are described with reference to FIGS. 12 to 14, respectively, each of which presents a possible variation of the message flow of the first embodiment.

Figure 9:
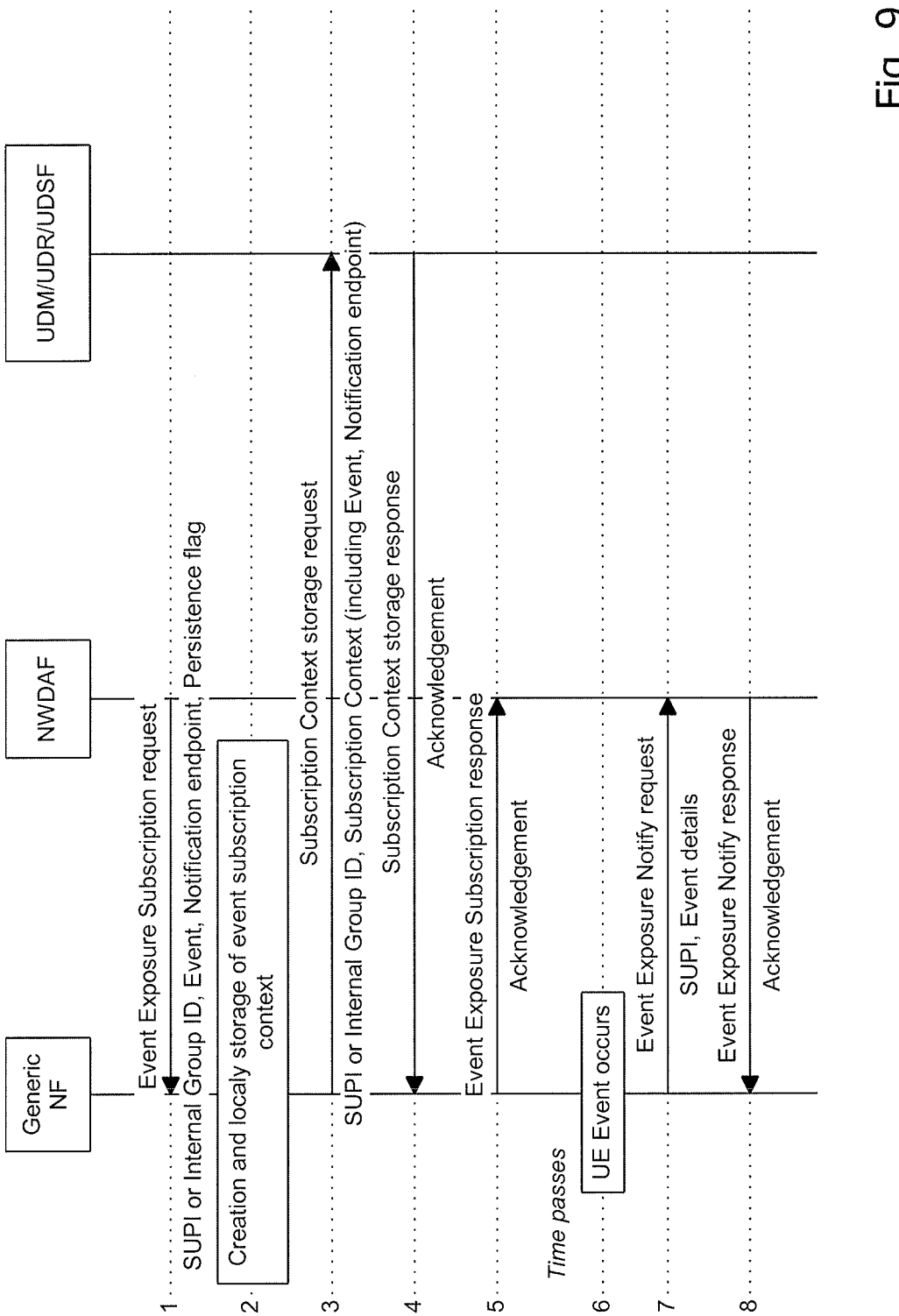
FIG. 9 illustrates a signaling diagram of an exemplary interaction between entities of the telecommunication sys-tem according to a first embodiment of the present disclo-sure.

According to the first embodiment, as shown in FIG. 9, the NWDAF may subscribe, in step 1, to an event exposure service at a serving NF (denoted as "generic NF" in the figure, which may be an AMF, SMF, PCF, UPF, or the like) for a UE or a group of UEs, including a persistence flag to indicate that the subscription is to be maintained as long as the UE is served by any instance of the serving NF. When the serving NF receives the subscription request including the persistence flag, it may create an event subscription context as subscription restoration information in step 2 and, in steps 3 and 4, the event subscription context may be stored in the UDM/UDR/UDSF to make it persistent, as described above. In step 5, the serving NF may acknowledge the subscription to the NWDAF and, in steps 6 to 8, the serving NF may produce notifications related to events detected for the UE and may send these notifications to the NWDAF as per regular procedures.

Figure 10:
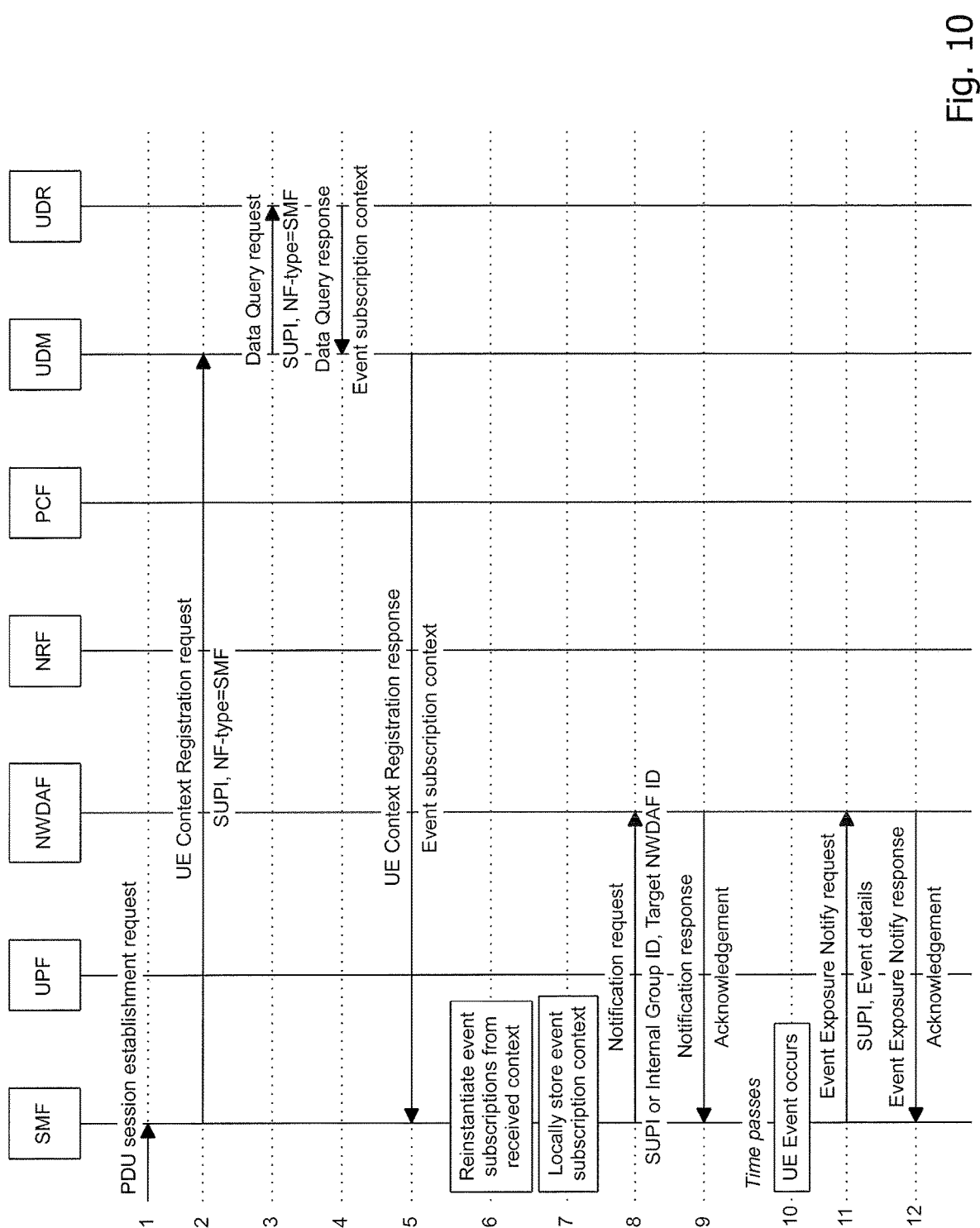
FIG. 10 illustrates a signaling diagram of an exemplary interaction between entities of the telecommunication sys-tem according to the first embodiment of the present dis-closure.

FIG. 10 illustrates in more detail how the event subscription context may then be used to restore and maintain the subscription in case of a PDU Session establishment of the UE, for example. FIG. 10 exemplifies an initial allocation of a serving NF by an SMF allocated in a PDU session establishment procedure. In step 1, the SMF may initially be allocated as a control node of the PDU session which the UE is about to establish. When the SMF registers in step 2 as the SMF for this PDU session of the UE, the UDM may query the UDR in step 3 to retrieve the stored subscription event context. In step 4, the UDR may respond with the data pertaining to the existing active event subscription context, and the UDM may include the retrieved event subscription context in the registration response sent back to the SMF in step 5. The SMF may then reinstantiate the event subscription in accordance with the received context in step 6 and may locally store the received content in step 7. In step 8, the SMF may notify the subscriber NWDAF that this SMF is now the serving NF instance which holds the event subscription context. This may provide an update to the NWDAF as to which NF currently holds the subscription state, i.e., currently generates events for this UE or a group of UEs as part of the subscription. In step 9, the notification may be acknowledged by the NWDAF. It will be understood in this regard that a lack of steps 8 and 9 would potentially make the NWDAF contact an outdated (or non-existent) NF for canceling the subscription. When the SMF then detects, in step 10, events that need to be reported for the UE, the SMF may produce corresponding event notifications, which may be sent (e.g., taking the NWDAF address as notification endpoint, including an event report) and acknowledged in steps 11 and 12 accordingly.

Figure 11:
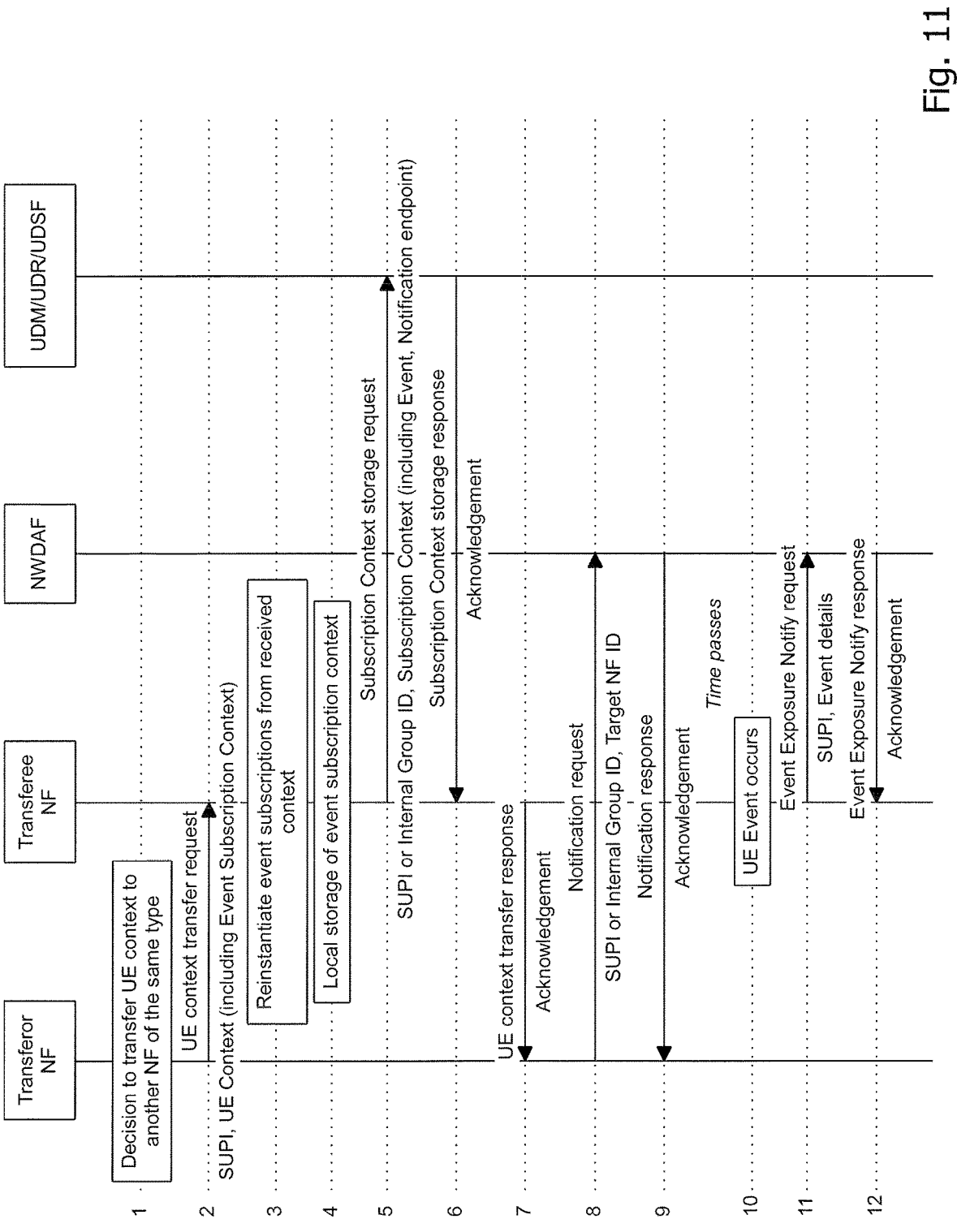
FIG. 11 illustrates a signaling diagram of an exemplary interaction between entities of the telecommunication sys-tem according to a variant of the first embodiment of the present disclosure.

FIG. 11 illustrates a variant of the first embodiment in which the event subscription context is transferred directly from a transferor NF (e.g., initial AMF, SMF, PCF, UPF, etc.) to a transferee NF (e.g., replacement AMF, SMF, PCF, UPF, etc.). This context transfer may be due to mobility of the UE to a closer NF, or due to the existence of a less congested or more powerful serving NF, for example. When the transferor NF initiates, in step 1, the transfer of the UE context, it may include the event subscription context in the message that initiates the UE context transfer in step 2, i.e., in other words, as part of the UE context. The transferee NF that receives the UE context may analyze its content, extract the event subscription context and reinstantiate the event subscription from the context in step 3. In step 4, the transferee NF may locally store the event subscription context and, then, remotely store the event subscription context in the UDM/UDR/UDSF to make it persistent in steps 5 and 6. In step 7, the transferee NF may inform the transferor NF of the success of this procedure. As described above, the event subscription context stored in the UDM/UDR/UDSF may be necessary in case the UE deregisters, goes out of coverage, or the transferee NF fails, for example. In steps 8 and 9, the transferor NF may send a notification to the NWDAF informing the NWDAF that, from that point onward, the subscription context is held by the transferee NF, so that any changes to the subscription may be addressed to the transferee NF instead of the transferor NF. It will be understood that, alternatively, the notification to the NWDAF (step 8) could also be sent from the transferee NF instead of the transferor NF. In steps 11 to 12, the transferee NF may then send event notifications as per regular procedures, as described above.

Figure 12:
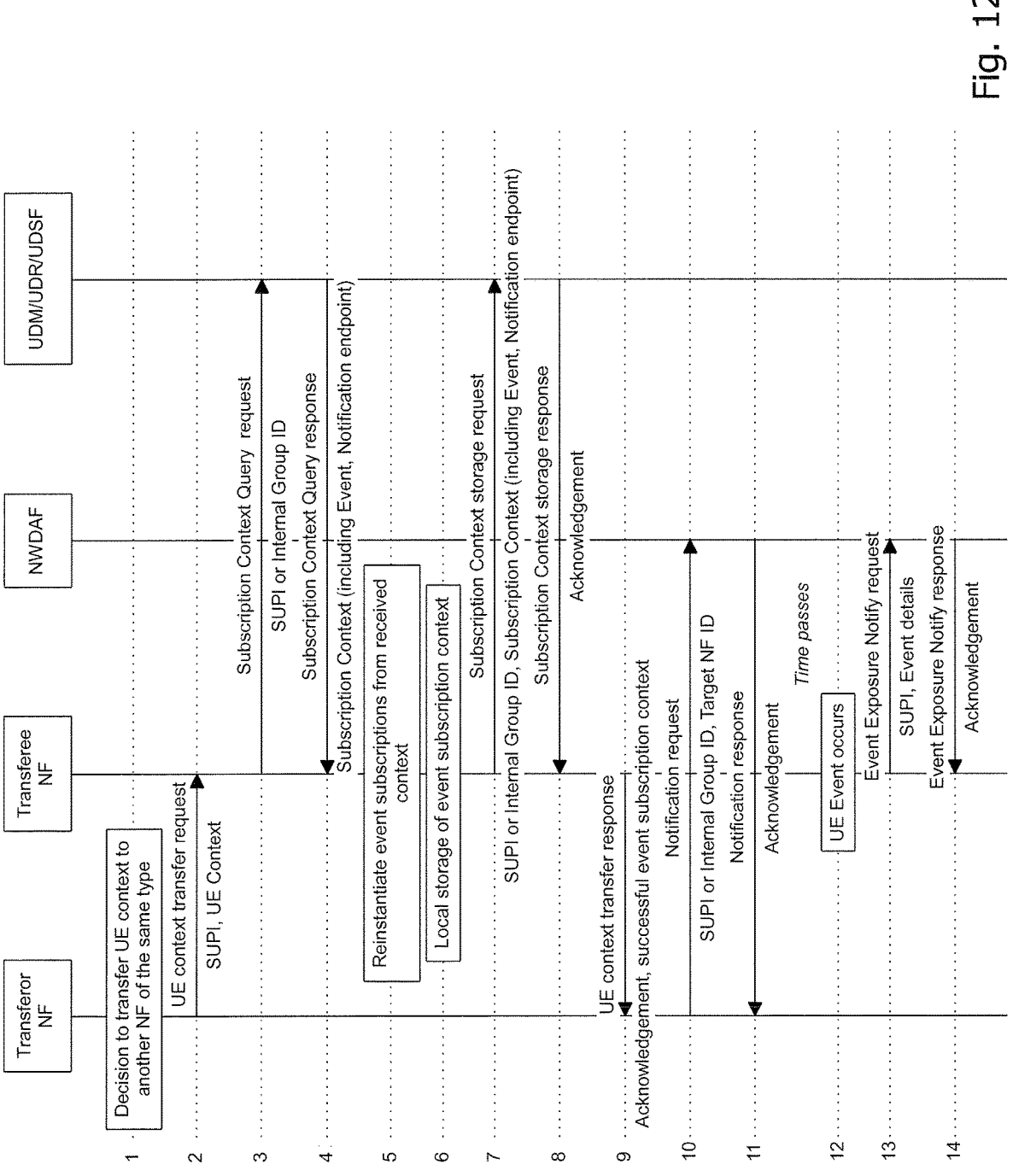
FIG. 12 illustrates a signaling diagram of an exemplary interaction between entities of the telecommunication sys-tem according to a second embodiment of the present disclosure.

FIG. 12 illustrates a second embodiment which differs from the above variant of FIG. 11 in that the context transfer request message according to step 2 does not contain the event subscription context (although the message may contain a UE context), so that the transferee NF retrieves the event subscription context from the UDM/UDR/UDF in steps 3 and 4. The subsequent steps 5 to 14 may correspond to steps 4 to 12 of FIG. 11. In other words, instead of the transferor NF directly transferring the event subscription context to the transferee NF, the transferee NF may rather retrieve the event subscription context from the UDM/UDR/UDSF which stores it in a persistent manner.

Figure 13:
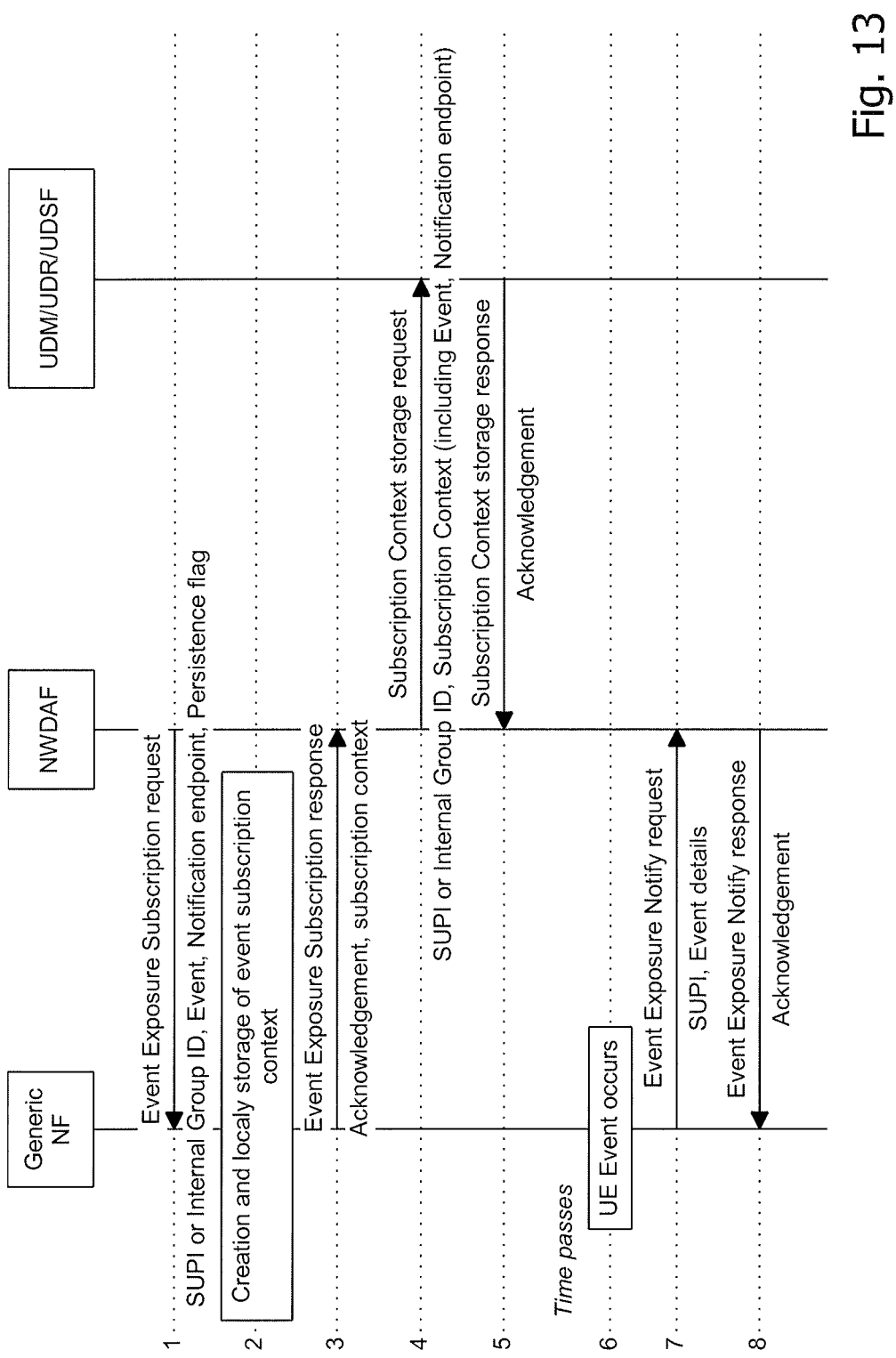
FIG. 13 illustrates a signaling diagram of an exemplary interaction between entities of the telecommunication sys-tem according to a third embodiment of the present disclo-sure.

FIG. 13 illustrates a third embodiment which differs from the above variant of FIG. 9 in that storing the event subscription context in the UDM/UDR/UDSF is carried out via the NWDAF. More specifically, the event subscription context generated by the serving NF in step 2 may be provided to the NWDAF in step 3 which, in turn, then may send a corresponding storage request to store the event subscription context in the UDM/UDR/UDSF in steps 4 and 5, thereby replacing steps 3 and 4 of FIG. 9. Therefore, instead of the serving NF directly storing the event subscription context in the UDM/UDR/UDSF, the NWDAF may store the event subscription context for the UE or group of UEs in the UDM/UDR/UDSF on behalf of the serving NF.

Figure 14:
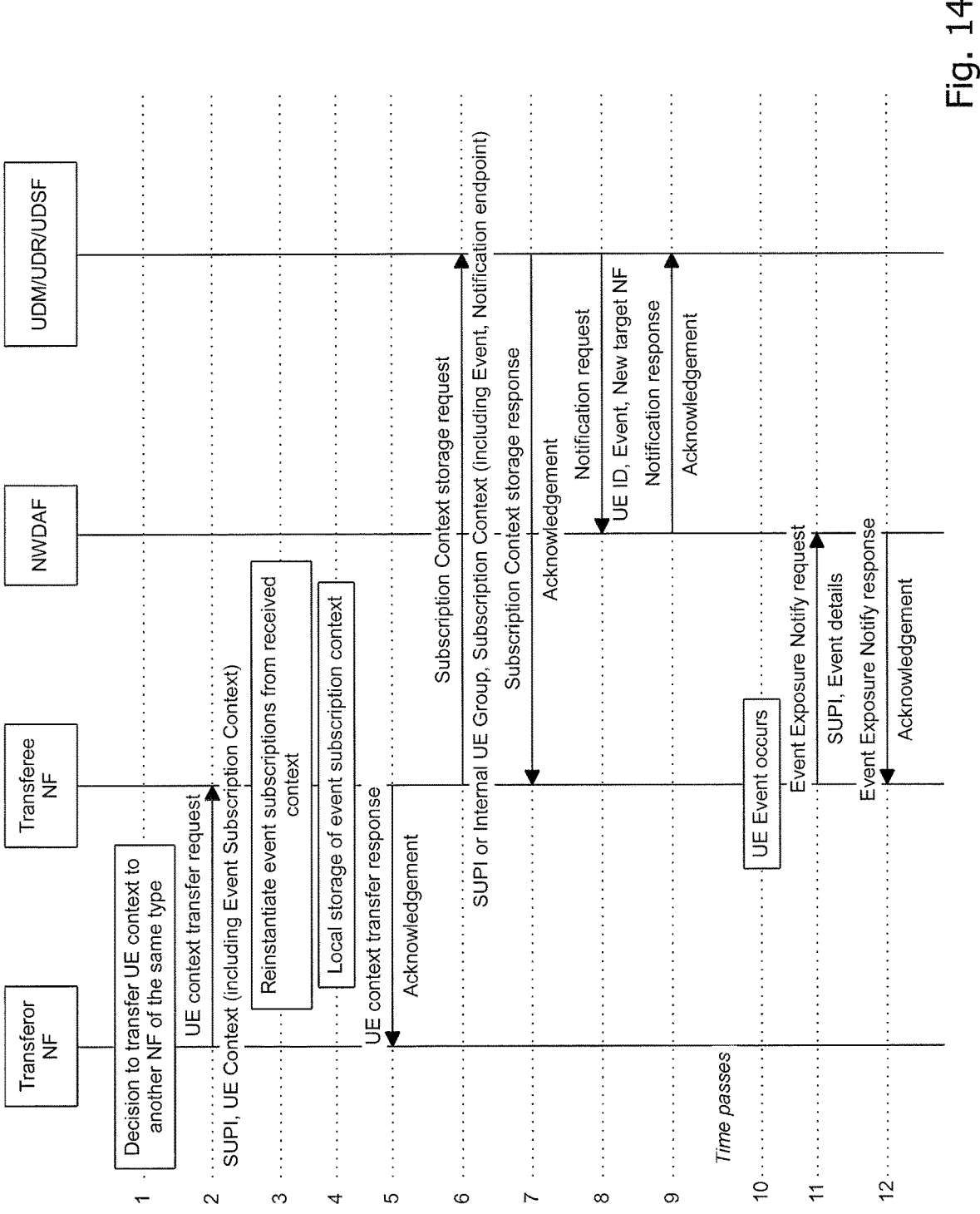
FIG. 14 illustrates a signaling diagram of an exemplary interaction between entities of the telecommunication sys-tem according to a fourth embodiment of the present dis-closure.

FIG. 14 illustrates a fourth embodiment which differs from the above variant of FIG. 11 in that it is not the transferor NF which sends the notification to the NWDAF to indicate which NF currently holds the subscription state, but it is rather the UDM/UDR/UDSF. In other words, instead of the transferor NF or the transferee NF, the notification informing the subscriber NF of the serving NF currently having the active subscription state may be generated and sent by the UDM/UDR/UDSF.

As has become apparent from the above, the present disclosure provides a technique for maintaining a subscription of a subscriber NF for receiving events related to a UE from a serving NF in a telecommunication system. The technique may enable a subscriber NF, such as an NWDAF, to keep receiving notifications of events, even if there are changes in the serving NFs, in case the UE moves, or when UE deregisters and reregisters again, for example. The subscriber NF may thus receive input data on the UE activity at any time the UE is connected to the telecommunication system, no matter whether the UE moves, or its registration or connectivity is temporarily interrupted. By the proposed technique, the subscriber NF may generate a single subscription for event reporting per UE and per serving NF. The subscription may survive UE mobility and deregistrations and, therefore, the subscriber NF may not need to track UE registration/deregistration/reregistration of UEs, and it may not need to keep track of mobility and reallocation to other serving NF either. Using the technique presented herein, a serving NF, such as an NWDAF, may thus collect user data continuously and may hence provide accurate analytic reports to other NFs.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for maintaining an event subscription of a subscriber Network Function (NF) for receiving events related to a User Equipment (UE) from a serving NF in a telecommunication system, the UE being served by a first instance of the serving NF, the method being performed by the first instance of the serving NF and comprising:

receiving an event subscription request from the subscriber NF, the event subscription request including a persistence indication indicating that the event subscription is to be maintained, the event subscription being for receiving events related to the UE from the serving NF;

triggering generating subscription restoration information enabling restoration of the event subscription for receiving events related to the UE from the serving NF in case the first instance of the serving NF ceases serving the UE, the subscription restoration information comprising at least a type of event subscribed to and an event subscription context; and triggering storing the subscription restoration information in a data storage function of the telecommunication system in association with the UE, the subscription restoration information used by a second instance of the serving NF for restoring the event subscription for receiving events related to the UE from the serving NF if the first instance of the serving NF ceases serving the UE.

2. The method of claim 1, wherein the subscription restoration information is stored as part of a context maintained for the UE in the telecommunication system.

3. The method of claim 1, wherein ceasing serving the UE occurs responsive to the UE being temporarily unconnected to the telecommunication system, and wherein the first instance of the serving NF and the second instance of the serving NF are the same.

4. The method of claim 1, wherein the first instance of the serving NF ceases serving the UE responsive to a reallocation of the serving NF from the first instance of the serving NF to the second instance of the serving NF, and wherein the first instance of the serving NF and the second instance of the serving NF are different.

5. The method of claim 4, further comprising triggering notifying the subscriber NF that the second instance of the serving NF now serves the UE.

6. The method of claim 1, wherein storing the subscription restoration information in the data storage function of the telecommunication system is carried out via the subscriber NF.

7. A method for maintaining an event subscription of a subscriber Network Function (NF) for receiving events related to a User Equipment (UE) from a serving NF in a telecommunication system, the UE being served by a second instance of the serving NF, the UE previously served by a first instance of the serving NF which has ceased serving the UE and the event subscription previously established with the first instance of the serving NF, the method being performed by the second instance of the serving NF and comprising:

receiving, from a data storage function of the telecommunication system which stores the subscription restoration information in association with the UE, subscription restoration information enabling restoration of the event subscription, the event subscription being for receiving events related to the UE from the serving NF, the subscription restoration information comprising at least a type of event subscribed to and an event subscription context; and triggering restoring the event subscription using the subscription restoration information.

8. The method of claim 7, wherein ceasing serving the UE occurred responsive to the UE being temporarily unconnected to the telecommunication system, and wherein the first instance of the serving NF and the second instance of the serving NF are the same.

9. The method of claim 7, wherein the first instance of the serving NF ceased serving the UE responsive to a reallocation of the serving NF from the first instance of the serving NF to the second instance of the serving NF, and wherein the first instance of the serving NF and the second instance of the serving NF are different.

10. The method of claim 7, wherein the subscription restoration information is stored as part of a context maintained for the UE in the telecommunication system.

11. The method of claim 7, further comprising triggering notifying the subscriber NF that the second instance of the serving NF now serves the UE.

12. The method of claim 7, further comprising:

triggering generating updated subscription restoration information enabling restoration of the event subscription in case the second instance of the serving NF ceases serving the UE; and triggering storing the updated subscription restoration information in the data storage function of the telecommunication system in association with the UE, wherein the updated subscription restoration information is to be used by a third instance of the serving NF for restoring the event subscription if the second instance of the serving NF ceases serving the UE.

13. A method for maintaining an event subscription of a subscriber Network Function (NF) for receiving events related to a User Equipment (UE) from a serving NF in a telecommunication system, the UE being served by a first instance of the serving NF, the method being performed by the subscriber NF and comprising:

triggering sending an event subscription request to the first instance of the serving NF, the event subscription request including a persistence indication indicating that the event subscription is to be maintained, the persistence indication causing the first instance of the serving NF to trigger generating subscription restoration information enabling restoration of the event subscription in case the first instance of the serving NF ceases serving the UE, and to trigger storing the subscription restoration information in a data storage function of the telecommunication system in association with the UE, the subscription restoration information to be used by a second instance of the serving NF for restoring the event subscription if the first instance of the serving NF ceases serving the UE, the event subscription being for receiving events related to the UE from the serving NF, the subscription restoration information comprising at least a type of event subscribed to and an event subscription context.

14. The method of claim 13, wherein the subscription restoration information is to be stored as part of a context maintained for the UE in the telecommunication system.

15. The method of claim 13, wherein storing the subscription restoration information in the data storage function of the telecommunication system is to be carried out via the subscriber NF.

16. The method of claim 13, wherein when ceasing serving the UE occurs responsive to the UE being temporarily unconnected to the telecommunication system, the first instance of the serving NF and the second instance of the serving NF are the same.

17. The method of claim 13, wherein when the first instance of the serving NF ceases serving the UE responsive to a reallocation of the serving NF from the first instance of the serving NF to the second instance of the serving NF, the first instance of the serving NF and the second instance of the serving NF are different.

18. The method of claim 13, further comprising, when the first instance of the serving NF ceases is serving the UE, receiving a notification informing the subscriber NF that the second instance of the serving NF now serves the UE.

19. The method of claim 18, wherein the notification is received from at least one of the first instance of the serving NF, the second instance of the serving NF, and the data storage function of the telecommunication system.

20. A method for maintaining an event subscription of a subscriber Network Function (NF) for receiving events related to a User Equipment (UE) from a serving NF in a telecommunication system, the UE being served by a first instance of the serving NF, the method being performed by a data storage function of the telecommunication system and comprising:

receiving a request to store subscription restoration information in association with the UE, the subscription restoration information enabling restoration of the event subscription in case the first instance of the serving NF ceases serving the UE, the event subscription being for receiving events related to the UE from the serving NF, the subscription restoration information comprising at least a type of event subscribed to and an event subscription context;

triggering storing the subscription restoration information; and triggering providing the stored subscription restoration information to a second instance of the serving NF, the subscription restoration information to be used by the second instance of the serving NF for restoring the event subscription if the first instance of the serving NF ceases serving the UE.

21. The method of claim 20, wherein the subscription restoration information is stored as part of a context maintained for the UE in the telecommunication system.

22. The method of claim 20, wherein the request to store subscription restoration information is received from the first instance of the serving NF, optionally via the subscriber NF.

23. The method of claim 20, wherein, when ceasing serving the UE occurs responsive to the UE being temporarily unconnected to the telecommunication system, the first instance of the serving NF and the second instance of the serving NF are the same.

24. The method of claim 20, wherein, when the first instance of the serving NF ceases serving the UE responsive to a reallocation of the serving NF from the first instance of the serving NF to the second instance of the serving NF, the first instance of the serving NF and the second instance of the serving NF are different.

25. The method of claim 24, further comprising triggering notifying the subscriber NF that the second instance of the serving NF now serves the UE.

\* \* \* \* \*